United States Patent
Kohlhammer et al.

(10) Patent No.: US 8,214,378 B2
(45) Date of Patent: Jul. 3, 2012

(54) TIME-CRITICAL FILTERING OF INFORMATION USING DOMAIN ONTOLOGIES

(75) Inventors: Joern Kohlhammer, Darmstadt (DE); David Louis Zeltzer, Portsmouth, RI (US)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1553 days.

(21) Appl. No.: 10/544,955

(22) PCT Filed: Feb. 9, 2004

(86) PCT No.: PCT/US2004/003680
§ 371 (c)(1),
(2), (4) Date: Aug. 8, 2005

(87) PCT Pub. No.: WO2004/073239
PCT Pub. Date: Aug. 26, 2004

(65) Prior Publication Data
US 2006/0123027 A1      Jun. 8, 2006

Related U.S. Application Data

(60) Provisional application No. 60/446,144, filed on Feb. 10, 2003, provisional application No. 60/508,196, filed on Oct. 2, 2003.

(51) Int. Cl.
    *G06F 7/00* (2006.01)
(52) U.S. Cl. .................................. 707/758; 707/754
(58) Field of Classification Search .................. None
    See application file for complete search history.

(56) References Cited

U.S. PATENT DOCUMENTS 6,163,785 A    12/2000  Carbonell et al.
2002/0194201 A1*  12/2002  Wilbanks et al. .......... 707/104.1
* cited by examiner

*Primary Examiner* — Tim Vo
*Assistant Examiner* — Jau-Shya Meng
(74) *Attorney, Agent, or Firm* — Michael A. Glenn; Glenn Patent Group

(57) ABSTRACT

An ontology that is used to determine relationships between instances of objects having types. The ontology is made from a text file containing a DAML+OIL description of the ontology and includes a set of ontology objects and an accelerator that accelerates determination of the relationships. The accelerator is implemented using database tables and indexes. The ontology may be used as a data filter. A decision-centered visualization system uses the ontology to relate data items contained in event instances to task instances and to determine for a given task instance what portion of the data in the data item should be provided for display by a given task instance.

5 Claims, 10 Drawing Sheets

```
<daml:Class rdf:about="file:/C:/Documents and Settings/
    jkohlham.CRCG/My Documents/DCV-Mission-Entity.daml#Unit">
    <rdfs:label>Unit</rdfs:label>
    <rdfs:comment><![CDATA[Class for all mobile objects like
        friendly and hostile units, emergency
        vehicles, etc.       ]]>
    </rdfs:comment>
    <oiled:creationDate><![CDATA[2003-03-26T19:28:57Z]]>
    </oiled:creationDate>
    <oiled:creator><![CDATA[jkohlham]]></oiled:creator>
    <rdfs:subClassOf>
        <daml:Class rdf:about="file:/C:/Documents and
            Settings/jkohlham.CRCG/My Documents/DCV-Mission-
            Entity.daml#Mission-Entity"/>
    </rdfs:subClassOf>
    <rdfs:subClassOf>
        <daml:Restriction>
            <daml:onProperty rdf:resource="file:/C:/
                Documents and Settings/jkohlham.CRCG/My
                Documents/DCV-Mission-Entity.daml#has-IFF"/>
            <daml:hasClass>
                <daml:Class rdf:about="file:/C:/Documents
                    and Settings/jkohlham.CRCG/My
                    Documents/DCV-Mission-Entity.daml#IFF"/>
            </daml:hasClass>
        </daml:Restriction>
    </rdfs:subClassOf>
    <rdfs:subClassOf>
        <daml:Restriction>
            <daml:onProperty rdf:resource="file:/C:/
                Documents and Settings/jkohlham.CRCG/My
                Documents/DCV-Mission-Entity.daml#has-commander"/>
            <daml:hasClass rdf:resource="http://www.w3.org
                /2000/10/XMLSchema#string"/>
        </daml:Restriction>
    </rdfs:subClassOf>
    <rdfs:subClassOf>
        <daml:Restriction>
            <daml:onProperty rdf:resource="file:/C:/
                Documents and Settings/jkohlham.CRCG/My
                Documents/DCV-Mission-Entity.daml#has-unit-size"/>
            <daml:hasClass>
                <daml:Class rdf:about="file:/C:/
                    Documents and Settings/jkohlham.CRCG/My
                    Documents/DCV-Mission-
                    Entity.daml#Order-of-Battle"/>
            </daml:hasClass>
        </daml:Restriction>
    </rdfs:subClassOf>
</daml:Class>
```

Fig. 8

```
       CREATE TABLE event_type
1003  (event_type_id           int   NOT NULL,
1005   event_type_name         varchar(40),
1007   event_type_description  varchar(255),
       primary key (event_type_id));
       903

CREATE TABLE task_type
       (task_type_id           int   NOT NULL,
        task_type_name         varchar(40),
        task_type_description  varchar(255),
        primary key (task_type_id));
        907

CREATE TABLE event_task
1009  (event_type_id          int   NOT NULL,
1011   task_type_Id           int   NOT NULL,
1013   priority               int,
       primary key (event_type_id, task_type_id),
       foreign key (event_type_id) references event_type,
       foreign key (task_type_Id) references task_type);
       905

CREATE TABLE presentation_requirement
1017  (pr_id          int   NOT NULL,
1019   pr_attribute   varchar(50),
1021   task_type_id   int,
       primary key (pr_id),
       foreign key (task_type_id) references task_type);
       909

CREATE TABLE data_type
       (data_type_id            int   NOT NULL,
        data_type_name          varchar(40),
        data_type_description   varchar(255),
        primary key (data_type_id));
        913

CREATE TABLE data_requirement
1023 (data_type_id       int   NOT NULL,
1025  pr_id              int   NOT NULL,
      primary key (data_type_id, pr_id),
      foreign key (data_type_id) references data_type,
      foreign key (pr_id) references presentation_requirement);
      911

TIME-CRITICAL FILTERING OF INFORMATION USING DOMAIN ONTOLOGIES

CROSS REFERENCES TO RELATED APPLICATIONS

The present patent application claims priority from the U.S. provisional patent application 60/446,144, David Louis Zeltzer, et al., *Entity representation and management framework for decision-centered visualization*, filed 10 Feb., 2003, and 60/508,196, David Louis Zeltzer, et al., *Task representation and event handling for decision-centered visualization*, filed 2 Oct., 2003 and incorporates both of these applications by reference.

BACKGROUND OF THE INVENTION

1. Field of the Invention

The invention relates generally to the problem of filtering information and more particularly to the problem of filtering information in time-critical contexts.

2. Description of Related Art

A common task to which digital systems are put is filtering information. At the simplest level, digital systems filter information by rejecting input that must be wrong. For example, if a fill-in form requires a numeric value for a field and a user inputs a non-numeric value in the field, the system may be programmed to reject the non-numeric value. At a somewhat more complicated level, a digital system may need to determine the context to which the sequence of characters being input at the keyboard belongs: for example, is the sequence intended for a document that the user is editing, or is it intended to be input to a dialog box as a search string?

Clearly, the more complex the information being filtered is and the more contexts the information may be applied to, the more difficult it is to filter the information correctly and quickly. FIG. 4 gives a general overview of the information filtering problem. Filtering system 401 has an information filter 407 which receives an information item 403 which includes values 405(1 ... n) and provides subsets 411(1 ... k) of those values 405 to a number of different contexts 409(1 ... k), with each subset 411(*i*) containing exactly those values 405 which are required for context 409(*i*). Information item 403 may be one of many information items belonging to different types 404, with the type 404 of the information item determining the kinds of values which make up the set of values contained in the information item. When this is the case, information filter 407 must determine which of the contexts 409 an information item 403(*i*) with type 404(*k*) is relevant to and having done that, which values from the set of information 406 for type 404(*k*) are relevant to each of those contexts.

Traditionally, an information filter 407 has been implemented as a computer program: the programmer who writes filter 407 knows which types of information items are relevant to which contexts and also knows which values of a relevant type are relevant values for a context. The program keeps track of which contexts are active, and when an item of information comes in, the program determines from the item's type which of the active contexts the item of information is relevant to and then selects the values from the item of information that are relevant to a particular context and provides them to the context. One problem with implementing information filter 407 as a program is that as the number of contexts and/or the number of types of information items increase, the size and complexity of the program increase rapidly. As the size and complexity of the program increase, so does the cost of writing it, and because big, complex programs have more bugs than small, simple ones, the cost of maintaining the program increases as well. Another, more important, problem is that the program that implements information filter 407 has been written for a specific combination of information item types and contexts and cannot be used for any other combination of information item types and contexts. The combination of information item types and contexts for which the program is written is termed the program's domain, and computer programs are by their very nature domain specific and must be completely rewritten to work in a different domain. Moreover, because the program is tailored to a specific set of information types and a specific set of contexts, the domain to which it is specific is tightly constrained, and consequently, what appear to a user to be small changes in the set of information types or in the set of contexts may still require extensive changes to the program.

Another way of implementing an information filter is to use a knowledge base to determine which types of information items are relevant to which contexts and which values of a particular type are relevant to a particular context. Knowledge is the objects, concepts and relationships that exist in some area of interest. The area of interest is the knowledge base's domain. The knowledge base is a collection of knowledge which is represented using some knowledge representation language. To give a simple example, the information item being filtered might be a description of a medevac helicopter in flight. The values included in the description might include the helicopter's type, capacity, heading, speed, and altitude. The knowledge base might include a class aerial vehicle with a subclass helicopter that itself has two subclasses, medevac helicopter and attack helicopter. The class aerial vehicle has the attributes "position, heading, speed, and altitude"; the subclass helicopter inherits the attributes of the class aerial vehicle and may further have the attribute "VTOL"; the subclasses of helicopter inherit the helicopter attributes and the subclass medevac helicopter may further include the attribute "non-ambulant capacity", while the subclass attack helicopter may further include the attributes "armament" and "troop capacity". The medevac helicopter is further a subclass of emergency vehicle, whose attributes are "non-ambulant capacity", "position" and "speed". The knowledge base might further include classes of context including an air traffic control context and an emergency evacuation context. All aerial vehicles, and therefore all helicopters, are relevant to the air traffic control context, but the only information that is relevant is the helicopter's position, heading, speed, and altitude. In the emergency evacuation context, all emergency vehicles are relevant, but since only medevac helicopters are emergency vehicles, medevac helicopters are the only kind of helicopter that is relevant to the emergency evacuation context. In this context, the relevant information is position, speed, and non-ambulant capacity. To filter the attribute values for the medevac helicopter, a program can determine from the context information in the knowledge base whether the context is the emergency evacuation context or the air traffic control context and can provide the values for those portions of the attributes that are relevant to the context.

The chief advantage of this approach is that the domain-specific information is in the knowledge base. The program doing the filtering need only be able to work generally with knowledge bases. Thus, changing the domain of the filtering is now a matter of using a different knowledge base rather than rewriting the program. Though construction of a knowledge base is not easy, it requires only an understanding of the relationships between the objects in the knowledge base, while writing a filtering program requires that understanding as well as the capacity to correctly implement a complex computer program. Making and debugging knowledge bases is thus easier and cheaper than making and debugging computer programs. The disadvantage of using knowledge bases to filter data has been that the process of determining what superclasses a subclass belongs to and determining which superclass relates to the context has been slow. In particular, filtering systems using knowledge bases have been too slow to use in applications where rapid responses have been required. One set of such applications is applications such as air traffic control or emergency management; another is applications which train humans to react properly in situations where rapid human reactions are required.

From the foregoing, it may be seen that what is needed in this area is an information filtering system that employs a knowledge base and can filter information quickly enough to be useful in time-critical applications. It is an object of the present invention to provide such an information filtering system.

SUMMARY OF THE INVENTION

One way in which the present invention achieves the above objective is by providing an ontology that is accessible to a data processing system and is used in the data processing system to determine relationships between instances of objects having types. The ontology includes a set of ontology objects which describes the types and the relationships between them and an accelerator that accelerates determination of a set of types that are relevant to a particular type.

Characteristics of the ontology include the following:
the relationships between the types include super- and subclass relationships;
the accelerator further accelerates location of the ontology objects for the types belonging to the set of relevant types;
the ontology includes an ontology file accessible to the data processing system from which the data processing system generates the ontology objects;
the computer system is able to access the ontology objects more rapidly than the ontology file; and
the data processing system generates the accelerator from the ontology file.

In one version of the ontology, the accelerator includes tables in a database which specify type relationships from which the set of relevant types may be determined. The tables further specify information from which the ontology objects for the types belonging to the set of relevant types may be located. The accelerator further includes indexes on the tables that accelerate determination of the set of relevant types in the database.

The ontology is employed in a data filter to filter data and in a visualization system to filter information contained in event instances so that the proper information is provided to task instances which contain information that is displayed in the visualization system.

Other objects and advantages will be apparent to those skilled in the arts to which the invention pertains upon perusal of the following Detailed Description and drawing, wherein:

BRIEF DESCRIPTION OF THE DRAWING

FIG. 8 is an exemplary portion of the data type ontology employed in the DCV system;
FIG. 10 is the DDL for the database tables making up accelerator 116.

Figure 1:
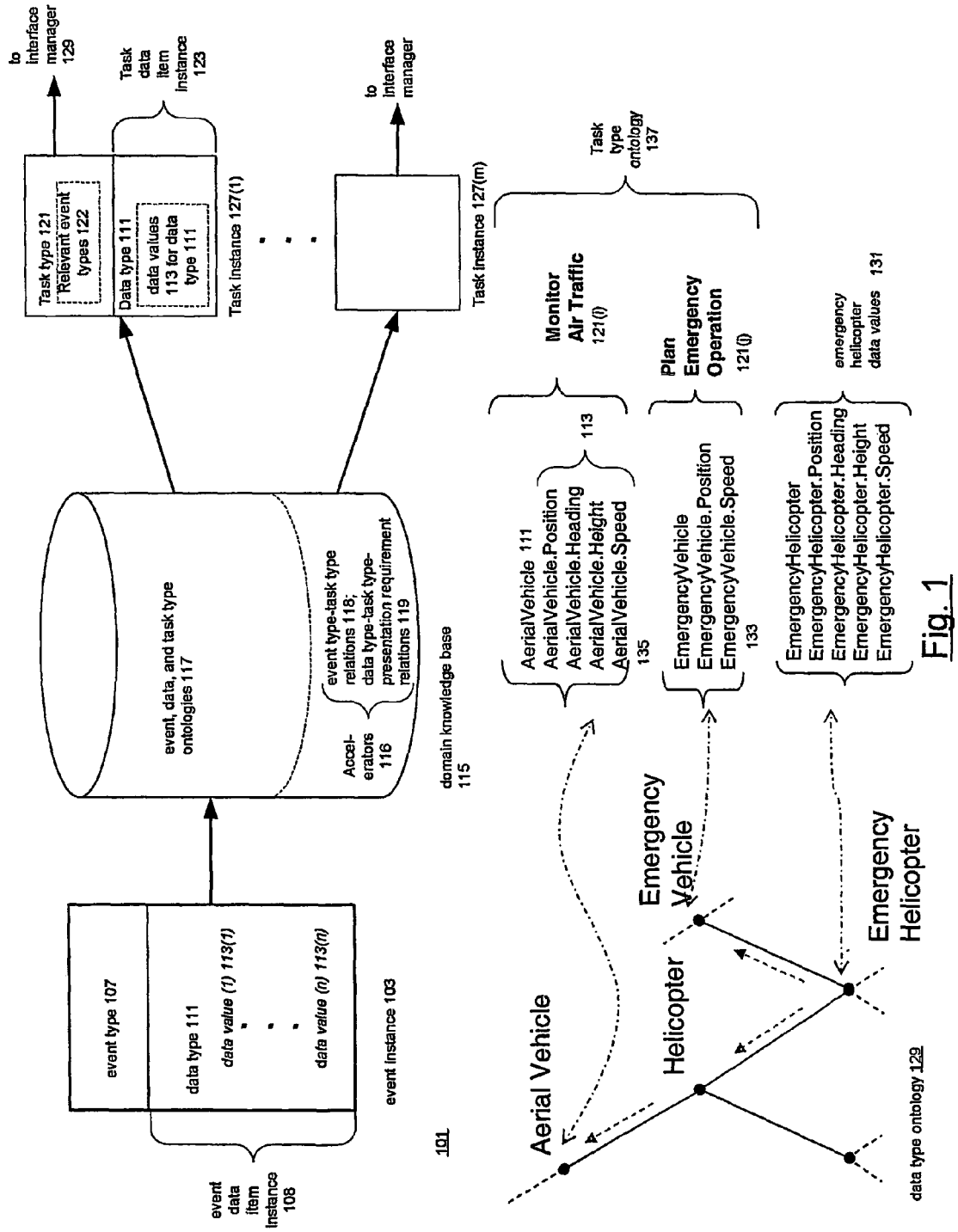
FIG. 1 is a block diagram overview of an information filtering system of the invention.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The information filtering system disclosed in detail herein is implemented in a decision-centered visualization system (DCV) for use in time-critical applications such as emergency management or military applications. A characteristic of the domains with which emergency management or combat is concerned is that they are dynamic and rich in information. The amount of information available and the speed with which it changes tend to overwhelm those working in the domain, and that in turn produces stress and causes mistakes. The problem with designing applications for those domains is to provide the user of the application the information the user needs without overwhelming the user. The DCV of the invention makes use of the highly-interactive and immersive information presentation techniques developed for industrial design or medical applications. The advantage of these information techniques is that they can produce a virtual reality; the disadvantage is that the virtual reality so produced may be as overwhelming as reality itself. To deal with this problem, the DCV employs the information filtering system of the invention to provide the user of the DCV with precisely the information the user needs to deal with his or her problems and no more. When used for systems that actually manage air traffic, emergencies, or combat, the DCV filters the information to reduce user stress and the number of mistakes resulting from stress and information overload. When used in systems that train workers for these tasks, the DCV filters the information to teach the user what the important information is, so that the user can concentrate on it while actually doing the task.

The following discussion will first provide an overview of the information filter, will then describe its use in the DCV, and will finally provide details of the filter's implementation and use in the DCV.

Overview of the Information Filter: FIG. 1

Figure 4:
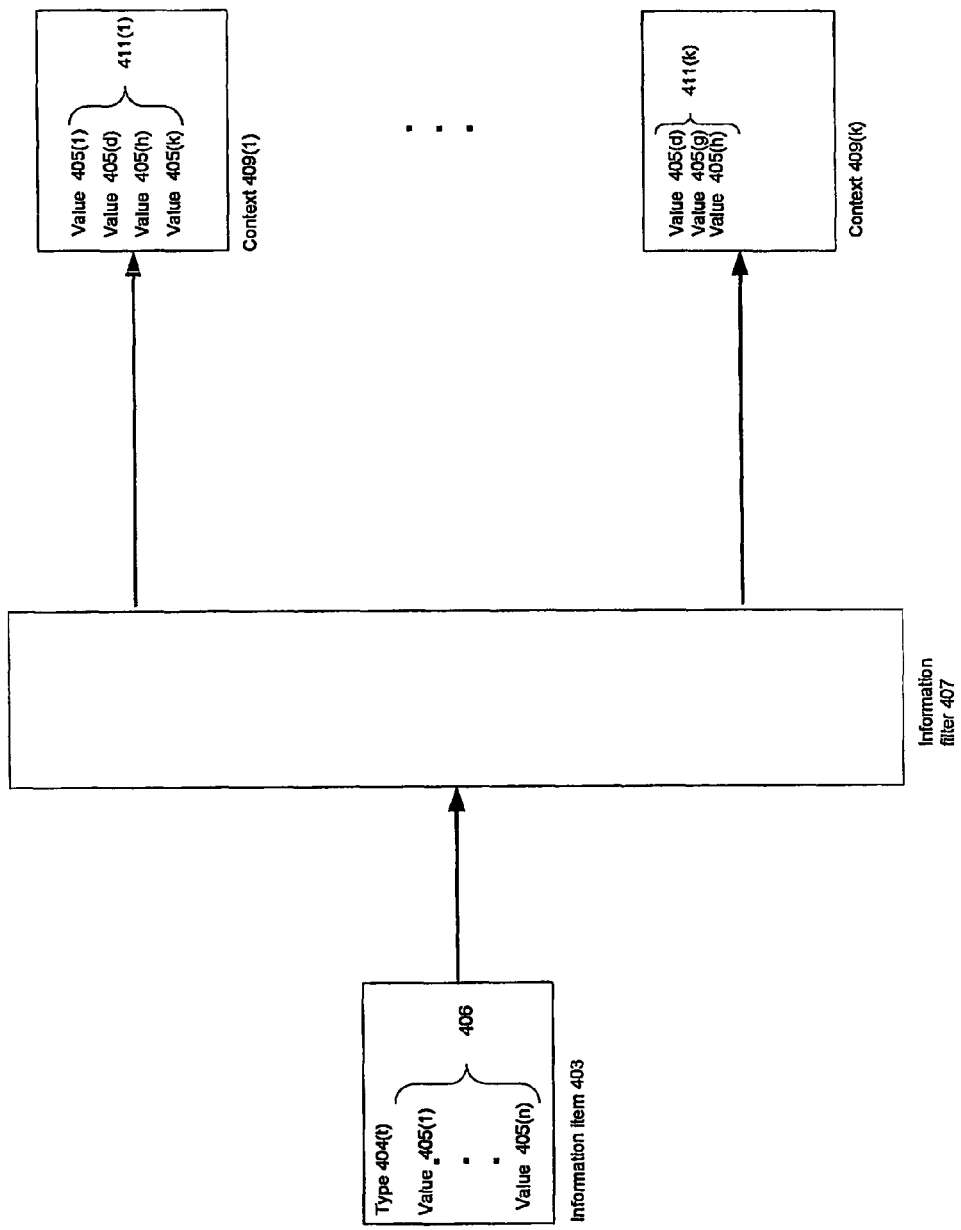
FIG. 4 is a block diagram that provides a general overview of information filtering.

FIG. 1 shows a filtering system 101 that employs a domain knowledge base 115 to filter information contained in a DCV system. In terms of the general filter block diagram of FIG. 4, event instance 103 corresponds to information item 403, domain knowledge base 115 and the associated software to information filter 407, and tasks 127 to contexts 409. Event instance 103 is an instance of data that represents an event that is of interest to the DCV system. Events may result from inputs from users of the DCV system or from inputs from an environment that the DCV system is monitoring. Events have types, so event instance 103 includes the type of the event represented by the event at 107 and an event data item instance 108. The event data item instance has a data type 111 and a set of data values 113(1 . . . n). The data type of the event data item instance is established by the even instance's event type 107. In the DCV system, a particular event instance 103 is relevant to one or more task instances 127, which provide data values from the event instance to an interface manager 129 for display in the visualization system. Each task instance 127 has a task type 121 and a task data item instance 123. Like event data item instance 108, task data item instance 123 has a data type 111 and a set of data values 113. Which task instances a particular event instance is relevant to is established by the event instance's event type 107. Which of the data values 113(1 . . . n) in event instance 103 are to be included in the data values 113 for a particular task instance is established by the data type 111 of the task data item instance 123, which in turn is established by the task instance's task type 121.

As can be seen from the foregoing, filtering the information from event instance 103 involves the following determinations:

determining which of the task instances the event instance is relevant to; and determining which of the data values of the event instance's event data item instance are to be included among the data values of each relevant task instance's task data item instance.

In system 101, these determinations are made using domain knowledge base 115. Domain knowledge base 115 has two major components: ontologies 117, which define how the data types, event types, and task types relate to each other, and accelerators 116, which speed up the determination of the relationships. In a preferred embodiment, accelerators 116 are tables and indexes in a relational database system.

An ontology is an explicit formal specification of how to represent the objects, concepts and other entities that are assumed to exist in a domain and the relationships that hold among them. There are many different kinds of ontologies and many of them can be used in system 101. The ontologies used in the preferred embodiment are DAML+OIL ontologies. DAML+OIL is described at www.daml.org/2001/03/daml+oil-index.html, which is hereby incorporated by reference into this patent application.

A DAML+OIL ontology contains descriptions of classes, slots, and individuals. Classes are collections of objects. They are unary predicates such as person. Classes may be related to other classes by stating that one is a subclass of another—i.e., person is a subclass of mammal. Anything that is an instance of a person must also be an instance of a mammal. In the following, keywords are specified in bold. We could define person below:

class-def person
subclass-of mammal

Classes will typically also contain information about how their members relate to other objects.

Slots are binary relations. They may also be related to each other via the notion of subrelation.

For example, the slot daughter-of could be defined as follows:

slot-def has-daughter
subslot-of has-child

This defines a slot has-daughter that is a subslot of has-child, i.e., every pair (x,y) that is an instance of has-daughter must also be an instance of has-child. Slots may also be constrained through the use of slot-constraints. One can limit the type of a slot filler by stating that it must be of a particular type. For example, one can require that the filler of a has-daughter slot must be a female as follows:

slot-constraint has-daughter
value-type female

There are a number of kinds of slot constraints. The number of fillers a slot can have may be specified through the notion of cardinality. For example, one might define a class of people who have either one or two daughters who are doctors as follows:

slot-constraint has-daughter
max-cardinality 2 doctor
min-cardinality 1 doctor (the foregoing discussion and examples are from Sean Bechofer, et al., *An informal description of Standard Oil and Instance Oil*, 28 Nov. 2000, found at www.w3.org/TR/rdf-primer). Details about DAML may be found at www.daml.org.

Returning to FIG. 1, an example portion of the data type ontology is shown at 129. There are four data types shown: Aerial Vehicle, Helicopter, Emergency Vehicle, and Emergency Helicopter. Lines connecting the data types show super-and subclass relationships. Thus, Helicopter is a subclass of Aerial Vehicle and Emergency Helicopter is a subclass of both Helicopter and Emergency Vehicle. Both Aerial Vehicle and Emergency Vehicle are subclasses of a class Vehicle (not shown). Each data type has a number of slots for data values 113; as shown at 135, the slots for Aerial Vehicles include slots for the vehicle's position, heading, height, and speed. As may be seen at 133, the slots for Emergency Vehicles have slots for position and speed only, while Emergency Helicopter, as a subclass of Aerial Vehicle and of Emergency Vehicle, inherits both Aerial Vehicle's slots and Emergency Vehicle's slots. In this case, of course, the slots from the latter are a subset of the slots from the former.

Also shown are two task types from task type ontology 137. Task type 121(*i*), Monitor Air Traffic, includes slots for data items of the type Aerial Vehicle, as shown at 135, while task type 121(*j*), Plan Emergency Operation, includes slots for data items of the type Emergency Vehicle, as shown at 133. Like data types, task types may have sub- and superclasses. The ontology for a task type 121 also has slots for the event types 122 that are relevant to the task type. No portion of the ontology for event types is shown, but event types may also have sub and superclasses.

Assuming that the event type ontology includes an event type Vehicle Detected which may include as subclasses any event type which includes a data item whose type is Vehicle or a subclass of Vehicle, if event instance 103 is an instance of an event of type Emergency Helicopter Detected, the first issue is what task instances the Emergency Helicopter Detected event instance is relevant to. According to the event type ontology, it is any task instance whose task type specifies an event type that is Emergency Helicopter Detected or one of its superclasses. Task type ontology 137 includes at least two such task types, Monitor Air Traffic and Plan Emergency Operation.

Data type ontology 129 is used to determine which data values of the Emergency Helicopter data instance are required for the task instances the event instance is relevant to. When the task instance has a data item of type Emergency Vehicle, the data type ontology indicates that the data item's values are the vehicle's position and speed, and it is those values which the Plan Emergency Operation task instance receives from the event instance with the Emergency Helicopter data instance. Similarly, when the task instance has a data item of type Aerial Vehicle, the data type ontology indicates that the data item's values are the aerial vehicle's position, heading, height, and speed, and it is those values which the Monitor Air Traffic task instance receives from the event instance.

Figure 3:
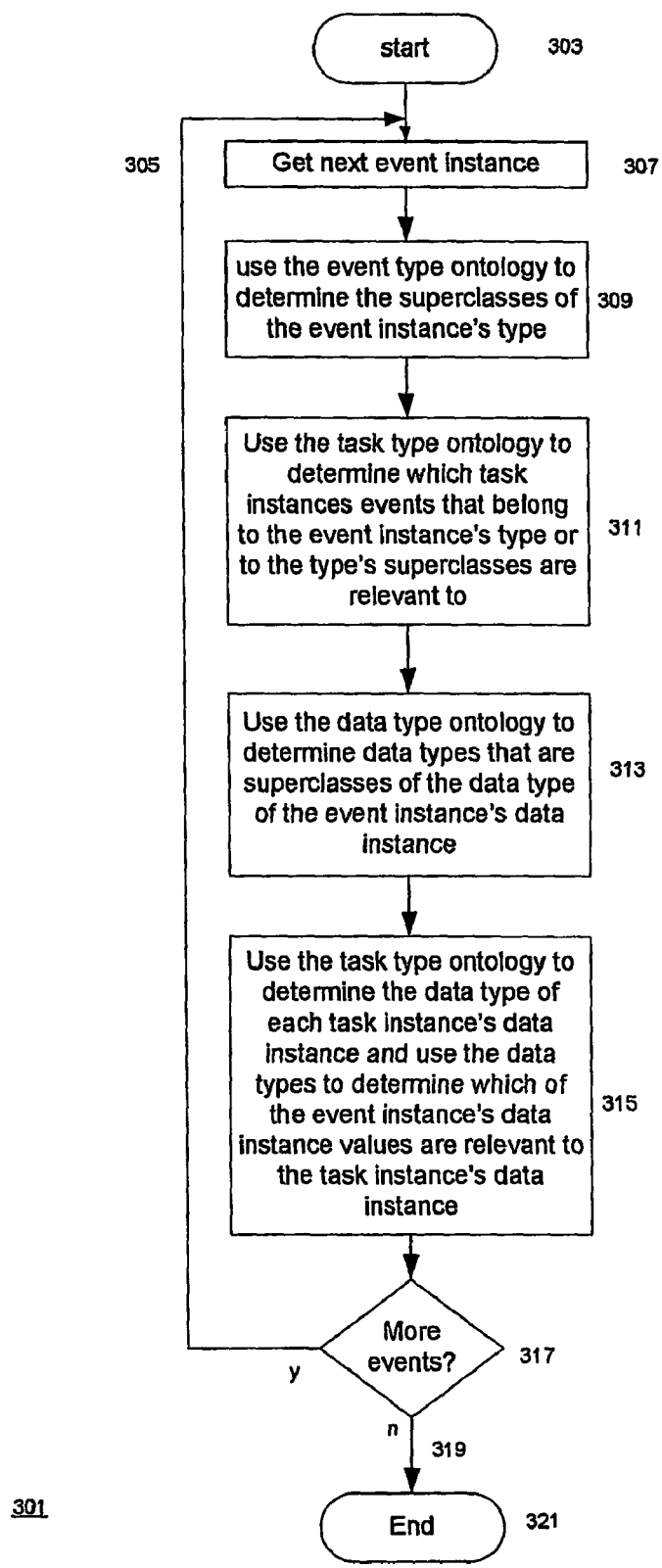
FIG. 3 is a flowchart of the operation of the information filtering system of FIG. 1.

Method of Filtering Event Instances: FIG. 3

FIG. 3 is a flowchart 301 of the technique used in filtering system 101. Starting at 303, the first step is to get the next event instance 103 (307). Next, the program uses the event type ontology to determine the superclasses of the event instance's type (309). The next step is using the task type ontology to determine which task types the event instance's type or its superclasses are relevant to (311). The next step is to use the data type ontology to determine which data types are superclasses of the data type of the event instance's data instance (313). Then the task type ontology is used to determine the data types of the task instance's data instances and those data types are used to determine which of the event instance's data instance values are relevant to the task instance's data instances (315). This done, the next event instance is processed, as indicated by loop 305, which runs as long as there are events. The flowchart assumes that event instances are taken off an event instance queue or devices are polled for event instances, but the techniques of blocks 309-315 could also be applied in response to the arrival of an event.

It should be pointed out here that the method does not necessarily require that there be a hierarchy of event types or that the task types specify the event types that are relevant to them. As long as a task type specifies the data types of the data items belonging to instances of the task, the data type ontology and the task type ontology can be used to determine which task types an event instance that contains a data item of a particular type is relevant to. In such a version of the method, the data item ontology is used to determine the superclasses of the data item's type and the task type ontology is used to determine what task types the data item's type and its superclasses are relevant to. Indeed, if the event type ontology is in effect a reflection of the data type ontology of the data type of the event's data item, then the use of event superclasses in the method of FIG. 3 is in effect an optimization of the alternative method just described.

Figure 5:
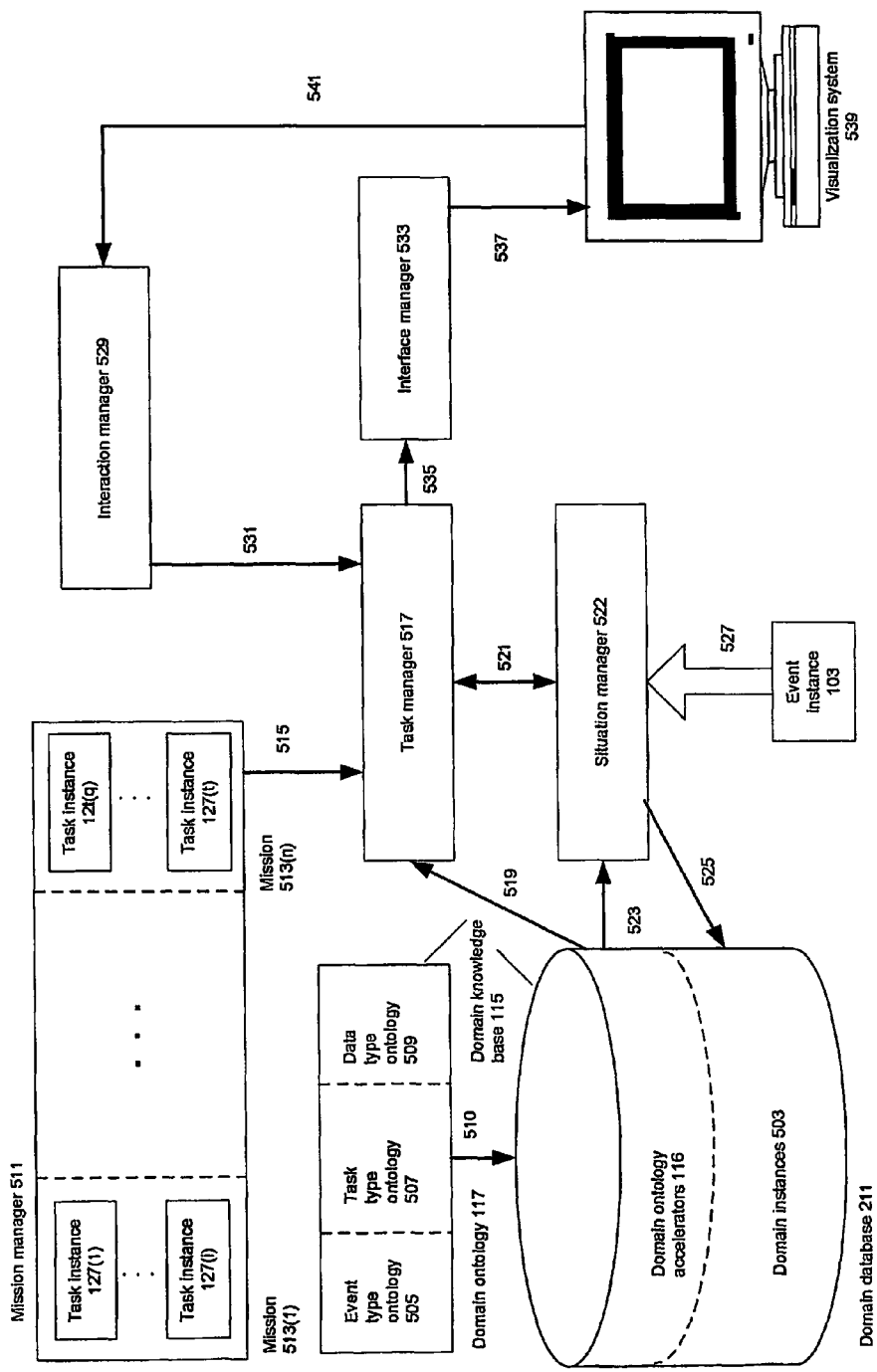
FIG. 5 is a block diagram of the DCV system in which the information filtering system of the invention is implemented.

Overview of the DCV System in which the Information Filter is Used: FIG. 5

FIG. 5 is a conceptual overview of DCV system 501. DCV system 501 provides visualizations for a set of missions 513(1 . . . n) on visualization system 539. The missions are managed by mssion manager 511. Each mission includes one or more task instances 127 that represent tasks that are currently being performed by the mission. DCV system 501 alters a visualization on visualization system 539 in response to event instances 103 received in DCV system 501. DCV system 501 determines which task instances 127 an event instance 103 is relevant to and then provides the values from the event instance 103's data which are relevant to the task instances the event instance is relevant to. The data values are then employed to alter the display in visualization system 539.

As may be seen from this description, DCV system 501 functions as an information filter with regard to the event instances 103 received in DCV system 501. The information used to do the filtering is contained in domain knowledge base 115, which includes domain ontology 117 and domain ontology accelerators 116. Domain ontology 117 contains an ontology 505 for all of the event types which event instances 103 received in DCV 501 may have when DCV system 501 is operating in the domain of domain knowledge base 115, an ontology 507 for all of the task types for all of the missions which mission manager 511 may manage when operating in the domain, and an ontology 509 for all of the data types which can occur in event instances 103 or task instances 127 when DCV 501 is operating in the domain. Domain ontology accelerators 116 are database tables and indexes for those tables in domain database 211. Also contained in domain database 211 are domain instances 503. These are the event instances, data item instances, and task instances that are currently in use in DCV system 501.

The remaining components of system 501 are programs. Situation manager 522 receives incoming event instances 103 and determines for each event instance what task instances 127 the event instance is relevant to. To do this, situation manager 522 uses accelerators 116 with event type ontology 505 and task type ontology 507 to first determine the superclasses of event instance 103's event type and second determine which task types event instance 103's type and superclasses are relevant to. Event instance 103's data instance 108 and the list of task types are then provided to task manager 517. If there are no task instances corresponding to the task types, task manager 517 so indicates to situation manager 522 and situation manager 522 stores event instance 103 in domain instances 503 for later use.

Task manager 517 keeps track of the active task instances 127 and does the following:

determines which values of the incoming event instance 103's data item instance are relevant to each task instance the event instance is relevant to; and provides those values to interface manager 553 for display on visualization system 539.

To do this, task manager 517 uses accelerators 116 with task type ontology 507 and data type ontology 509 to determine the superclasses of data item instance 108's type 111 and uses data item instance 108's type and its superclasses together with the types of the task data item instances to determine which of the values in data item instance 108 are to be copied to each of the relevant task instances. That done, the values for each task instance are provided to interface manager 533 for display as determined by priorities established in the domain knowledge base for the combination of the task type and the event type. When information from two events is available simultaneously to a task instance, the information from the event with the higher priority is sent to the interface manager first. How the information is displayed is determined by interface manager 533.

Figure 6:
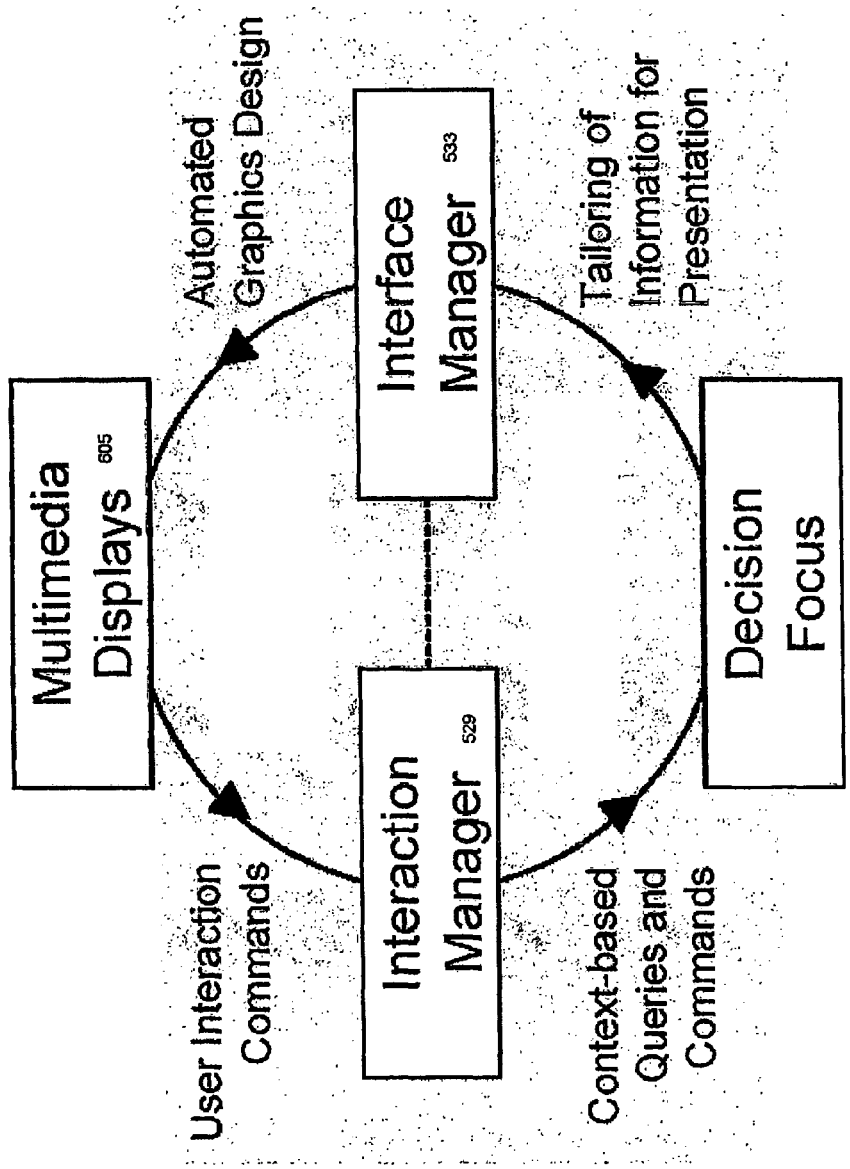
FIG. 6 is an overview of the operation of the DCV system.

FIG. 6 provides a high-level overview 601 of the operation of DCV 501. Decision focus component 603 is that portion of DCB 501 that performs the task of filtering the information contained in the event instances. As indicated by the reference numbers in parentheses following the reference number 603, the components of decision focus 603 are domain database 211, domain ontology 117, task manager 517 and situation manager 522. Decision focus 603 receives event instances 603 from the environment as well as event instances 603 resulting from context-based queries and commands from interaction manager 529, produces information that has been filtered so that only what is needed is displayed in visualization system 539, and provides the filtered information 535 to interface manager 533, which puts it in the proper form for display in multimedia displays 605 (for example, a visualization system 539), while interaction manager 529 responds to user commands from multimedia displays 605.

Figure 7:
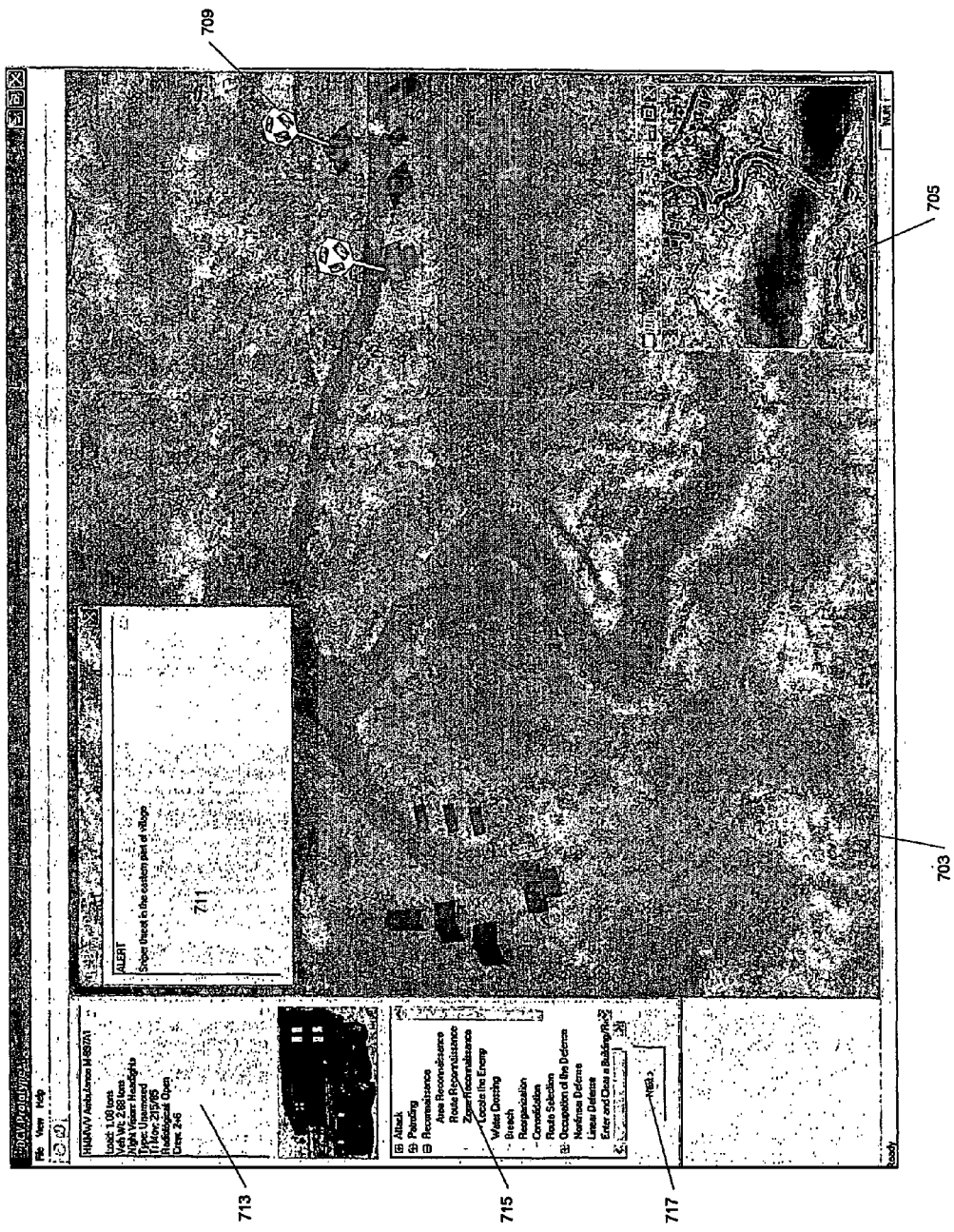
FIG. 7 is an example of a display produced by the DCV system.

An Example of a Display Produced by DCV 501: FIG. 7

FIG. 7 shows a display 701 produced by DCV 501 for a military training application. The greatest part of display 701 is taken up by a rendering 703 of a tactical situation as it might be seen by someone overlooking the situation from a hill or a low-flying aircraft. Snipers are in the locations indicated at 709 and an ambulance is on the road in the lower center. The range of the snipers' weapons is indicated by the radius in the center of the rendering. The position and range information for the snipers are from data instances that have been received via event instances, as is the position of the ambulance. A map 705 provides another view that again shows the positions of the snipers, the range, and the position of the ambulance. The user of DCV 501 has been notified of the presence of the snipers by alert 711. On the left hand side of display 701 are displayed details about the ambulance at 713; the user obtained this information by clicking on the ambulance in display 701. Again, this information is from the values of the ambulance data item instance in the event instance resulting from the user's click. At 715 is a representation of the task type ontology for this particular training application. As can be seen, the reconnaissance task includes a number of subtasks that belong to subclasses of the reconnaissance task's type. To progress through the exercise, the user clicks on Next button 717.

Details of the Implementation of Domain Knowledge Base 115

The following discussion will first disclose an example portion of data type ontology 509 and will then disclose a preferred embodiment of domain ontology accelerators 116.

An Example Portion of Data Type Ontology 509: FIG. 8

FIG. 8 is the definition 801 of the data type Unit in the notation used in DAML-OIL. Instances having the Unit type or a subclass of it represent mobile objects. The definition 803 is written in XML, and like all XML, the definition may have nested subcomponents. The beginning of a component is marked by <label:string> and the end of a component is marked by </label:string>. Thus, the beginning of the Unit type definition is <daml:Class> and the end is </daml:Class>. Important subcomponents of the type definition are the subclass definitions, which begin with <rdfs:subClassOf>, and which indicate which data types the UNIT type is a subclass of. Two of these will be explained in detail. The first subclass definition at 805 simply indicates that UNIT is a subclass of Mission-Entity, which is the class which all data types in type ontology 509 are subclasses of. The second subclass, defined at 807, is the Restriction subclass (809), which defines restrictions that apply to the class being defined and its subclasses. Here, the restriction is that data instances with the Unit type include a value called has_IFF. As set forth at 811, the value has the IFF data type, whose values indicate whether the data instance is a friend or a foe. Other restrictions are that instances of the Unit type include a value has Commander which indicates whether the unit has a commander, and a value has_unit_size, which indicates the unit's size.

When DCV 501 is being executed, the main memory of the processor upon which the system is being executed contains a set of objects made from text files containing the ontology. The objects are made by a parser that parses the XML in the DML+OIL text file and provides the definitions to a program written in Java or C++ that creates the objects.

Figure 9:
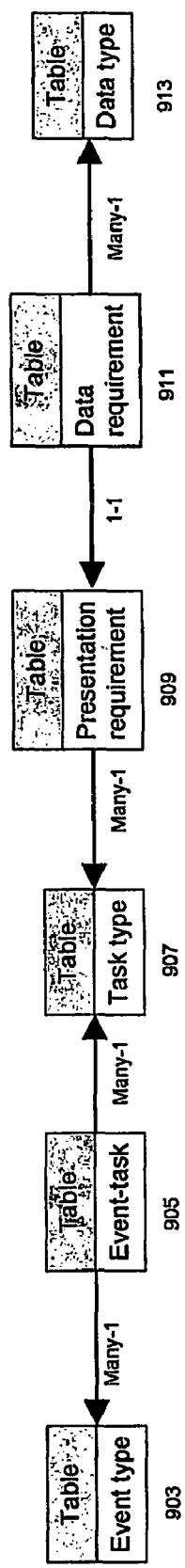
FIG. 9 is an entity-relationship diagram of the database tables making up accelerator 116.

Accelerators 116: FIG. 9

Even though the domain ontology is contained in main memory in the computer that executes DCV system 501, determination of the relationships between event instances, task instances, and data item instances still takes more time than is available in the highly-interactive activities for which DCV system 501 was designed. To speed up determination of these relationships, DCV system 501 uses an accelerator 116 consisting of tables and indexes in domain database 211. When DCV system 501 is operating, the database management system automatically moves components of domain database 201 into main memory as they are needed for efficient access to the information contained in the components. An advantage of using tables and indexes in a DBMS as an accelerator 116 is that database management systems provide rapid and scalable access where the amount of data being accessed is too great to permit storage of the data in main memory. Generally, the DBMS will hold the index structures plus the most recently accessed rows in main memory.

FIG. 9 is an entity-relationship diagram of the tables of accelerator 116 in a preferred embodiment. In such diagrams, arrows connecting the tables show relationships between them that are based on the occurrence of keys for rows in one table as values of fields in rows in others of the tables. For example, each row of the table Event-task 905 contains one field whose value is a key for a record in the table Event type 903 and another whose value is a key of a record in the table Task type 907. As shown there, the table in which the identifying value is a key is at the head of the arrow and the other table at the tail. In functional terms, what the arrow indicates is that the value of a field in a row of the table at the tail of the arrow can be used to retrieve a row from the table at the head of the arrow. The labels many-1 and 1-1 indicate how the numbers of rows in the two tables relate to each other. With many-1, there may be many rows in the table at the tail of the arrow that contain the key of a given row in the table at the head of the arrow; with 1-1, there will be a single row in the table at the tail of the arrow that has the key of the given row.

As its name implies, event type table 903 has a row for each event type in event type ontology 505. Each row includes the name of its event type, The name is used by DCV system 501 to locate the event type object corresponding to the row in the main memory of the computer upon which DCV system 501 is executing. Task type table 907 similarly has a row for each task type in task type ontology 507. The row includes the name of its task type and that name similarly serves to locate the task type objects. Data type table 913 is organized in the same way with regard to the data types of the ontology.

Event-task table 905 relates event types to task types and thus accelerates the determination of which event instances are relevant to which task instances. For each task type, there is a row in event-task table for each event type that is relevant to the task type. Fields in each row specify the ID of the row in event type table 903 for the event type and the ID of the row in Task type table 907 for the task type. Thus, to find what task types an event instance of a particular event type is relevant to, one need only query event-task table 905 to find the rows in that table for the event type, and those rows will also specify the relevant task types.

Presentation requirement table 909 and Data requirement table 911 together relate data values belonging to the data types to the task types, and thus accelerate the determination of which data values from a given event instance should be provided to a given task instance for display. Presentation requirement table 909 relates specifications of the data values required to display an instance of a task type to the task types and Data requirement table 911 relates the specifications of the data values to the data types that the data values come from. To find the data types that are the sources of the values for an event type, one need only look at the rows for the values in data requirement table 911 to find the data types the values come from. Still more acceleration is gained by the use of indexes which the database system provides in response to specifications in the DDL language. An index relates a value for a field in a row of a table to the number of the row in the table, making it possible to find the row without searching all the rows in the table for a field with a value that matches the desired value.

Details of the Accelerator Tables: FIG. 10

FIG. 10 presents the details 1001 of the tables of FIG. 9. Shown in the figure is the SQL data definition language (DDL) description of tables 903-913 of FIG. 9. This description is specific to the dialect of DDL used in the MySQL database system which is employed in the preferred embodiment; however, the DDL varies only in unessential details from that used in other relational DBMS systems. The database management system that manages domain database 211 can generate tables 903-913 from their DDL descriptions. The DDL description for a table defines the table's columns, and thus the fields that make up the table's rows. Beginning with event_type table 903, the table has three columns, event_type_id, 1003, which is the identifier for the table row. There is a row in the table for each event type defined by the ontology. event_type_name is the name of the event type in the ontology and the value of the field is used to locate the object for the event type in the main memory ontology. event_type_description is a description of the event type. Task_type table 907 and data_type table 913 are organized in the same fashion as event_type table 903. The names of the objects in these tables also identify the objects corresponding to the rows in the main memory ontology.

Event_task table 905 relates rows for event types and rows for task types for which the event types are relevant. Each entry relates a row for an event type to a row for a task type. There is a row in table 905 for each event type for each task type the event type is relevant to. At 1009 is seen the field for the event type's ID and at 1011 the field for the task type's ID. In a preferred embodiment, there may be priorities among the events that are relevant to a task. These priorities are defined in Event-task table 905, but not in the ontology. Priority field 1013 specifies the priority of the event type specified by field 1009 for the task type specified by field 1011. Task manager 517 takes these priorities into account when sending event data that is relevant to a task to interface manager 533. In other embodiments, the priorities may be defined in the ontology. An advantage of putting the priorities in Event-task table 905 is that the priorities may be altered during execution of the DCV.

Presentation_requirement table 909 relates a presentation attribute belonging to a task type to the task type. A presentation attribute is a value from a data item instance in an event instance that task manager 517 provides to interface manager 533 for a task instance for which the event instance is relevant. The task instance's task type defines the presentation attributes for instances of the task type, and the presentation attributes are thus part of the task type ontology. There is a row in presentation_requirement table 909 for each presentation requirement for each task type. The fields in the row include pr_id field 1017, which is the key for the row, pr_attribute 1019, which is the name of the presentation attribute in ontology 117 and consequently the identifier for the description of the presentation attribute in the main memory ontology, and task_type_id 1021, which is the key for the task type's row in task_type table 907.

Data_requirement table 911, finally, relates a presentation attribute to the data type that is its source. There is a row in the table for each presentation attribute. The fields are field 1023, which contains the ID of a data type and field 1025, which contains the ID of a presentation attribute. In a preferred embodiment, the DDL for the tables of accelerator 116 is written by hand using the information contained in domain ontology files 207. In other embodiments, the DDL for the tables of accelerator 116 could be automatically generated from domain ontology files 207.

Further acceleration of queries on the tables of accelerator 116 is achieved by indexes that are specified to database management system 209. Database management system 209 uses the specification to create the specified index and auxiliary indexes and then uses the indexes to speed up queries. Each index is created by a DDL command similar to the following:

CREATE INDEX task_type_name prefix ON task_type (task_type_name(10));

In response to this command, the database management system creates an index on the first ten characters of values in the column task_type_name in table task_type 907 to accelerate access to the names of task types. Since the connection between the ontology and the domain database is the "names" those index structures are very important in the tables task_type, event_type 903, and data_type 913. In the entity-relationship diagram of FIG. 9 each relationship between the tables is supported by an index. In summary, each table in FIG. 9 has indexes for the columns that are part of a relationship with another table or that are connected to the ontology. The specific indexes in the preferred embodiment are:

event_type_name (specifically created) and event_type_id (automatically created by the database system) for table event_type.

task_type_name (specific) and task_type_id (automatic) for table task_type.

a multiple column index (accelerates searches for combinations of columns) on event_type_id and task_type_id for table event_task.

pr_attribute, task_type_id (specific) and pr_id (automatic) for table presentation_requirement data_type_name (specific) and data_type_id (automatic) for table data_type.

a multiple column index on data_type_id and pr_id for table data_requirement.

Figure 2:
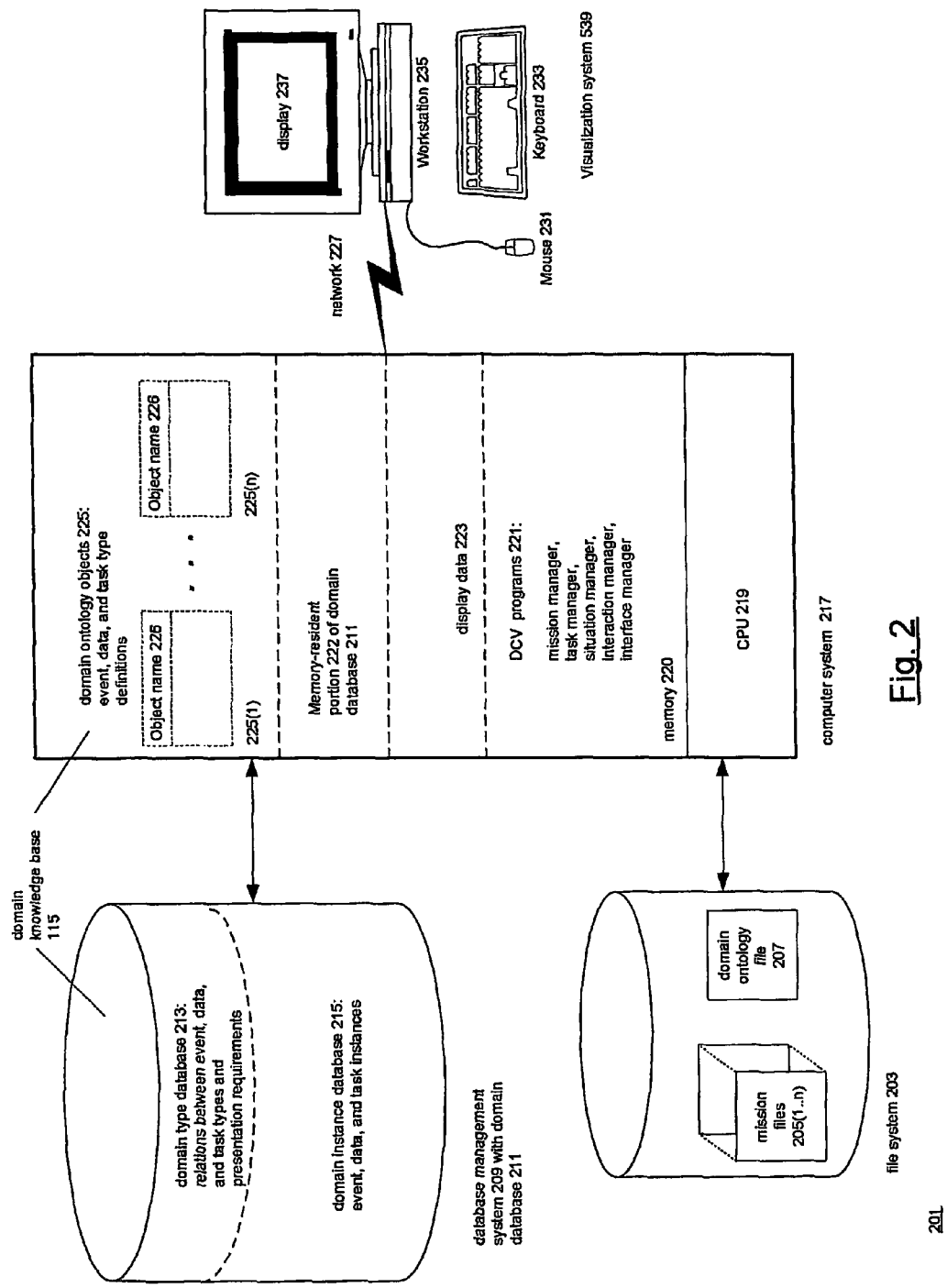
FIG. 2 is a block diagram showing how the information filtering system of FIG. 1 may be implemented in a digital computer system.

Overview of an Implementation of the DCV: FIG. 2

FIG. 2 shows an implementation of DCV 501. DCV 501 executes on a computer system 217 which has access to a database management system 209, a file system 203, and a visualization system 539. The latter may be any kind of visualization system that provides a display for outputs from computer system 217 and a way of providing inputs to computer system 217. Here, visualization system 539 is a workstation 535 that is connected via a network 227 to computer system 217 and includes a display 237 and a mouse 231 and a keyboard 233 as input devices. An immersive visualization system that could be used with DCV 501 is described in the PCT published patent application WO 00/65461, D. Schmalstieg, et al., *Tools for interacting with virtual environments*, published Nov. 2, 2000.

Computer system 217 may be any computer system that has a CPU 219 and a memory 220. Contained in memory 220 when DCV 501 is operating are the DCV programs 511, 517, 522, 529, and 533, the data 223 needed to generate displays in visualization system 539, a memory-resident portion of domain database 211, and domain ontology objects 225(1 . . . n). The latter are made as already described by parsing domain ontology file 207 and creating objects in memory 220 that represent the objects defined in the memory. Two such domain ontology objects 225(i) are shown. Each includes the name 226 of the ontology object it represents and the DCV task, mission, and situation manager programs 221 locate domain objects 225 by their object names. In addition, file system 203 also contains mission files 205, which describe missions and the tasks they include. Mission manager 511 uses mission files 205 to set up missions 513. Database management system 209 contains domain database 211. Domain database 211 includes domain instance database 215, which contains domain instances 503, and domain type database 213, which contains ontology accelerators 106.

A presently-preferred embodiment of DCV 501 is implemented in C++ and runs on Windows NT/2000/XP. It makes extensive use of platform independent libraries that allow for a relatively easy transition to other platforms. The domain database is maintained on a relational database system such as Oracle 9i® or MySQL. The preferred embodiment's user interface employs Criterion's RenderWare v3.4 for 3D terrain visualization and DevIL v1.6.5 for maps. Ontologies are written in DAML+OIL and mission files are written in RDF. Jena 1.6.1 via JNI is used to access both the ontology and the mission files.

Conclusion

The foregoing Detailed description has set forth to those skilled in the relevant technologies how to make and use an ontology with an accelerator and how to make and use a data filter that employs the ontology as well as a decision-centered visualization system that employs an ontology with or without an accelerator. The Detailed description also sets forth the best mode presently known to the inventors of making and using their inventions. It will be immediately apparent to those skilled in the relevant technologies that the techniques described herein are not limited to the DAML+OIL ontologies described herein, but may be used with any ontology that describes types and the relationships between them. Moreover, while it is particularly advantageous to implement the accelerator as a set of database tables with indexes, any technique which accelerates determination of relationships between types may be employed in the accelerator. In the database implementation, the particular forms of the tables and of the relationships between them will of course depend on the relationships between the types and the purpose for which the ontology is being used.

Though the ontology is used in a DCV in a preferred embodiment, it may be used in any kind of data filter. The implementation of the DCV may of course use any configuration of processors, database systems, and visualization systems which serves the purpose and the DCV may be used for many applications other than the ones disclosed herein. Definitions of event types, task types, and data types will depend on the application the DCV is used for, as will the relationships between types that are defined in the ontology.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A visualization system for producing a visualization, information relating to a task being performed in the visualization system being displayed in the visualization in response to occurrence of an event in the visualization system, the displayed information having as its source a data item instance in an event instance representing the event and being selected from the data item instance as determined by a task instance representing the task and the visualization system being implemented in a data processing system, wherein the data processing system accesses an ontology contained in a storage device, the data processing system using the ontology to determine relationships between instances of objects having types and the ontology comprising:

a set of ontology objects, the set of ontology objects describing the types and relationships therebetween; and an accelerator that accelerates a determination by the data processing system of a set of types that are relevant to a particular type, wherein the instances of objects are the data item instance and the task instance, the particular type is the type of the data item instance, and the set of types includes the type of the task instance and the visualization system applies the type of the task instance and the type of the data item instance to the ontology to determine what information is to be selected from the data item instance.

2. The visualization system set forth in claim 1 wherein: the data item instance is contained in an event instance; the set of types further includes the type of the event instance; and the type of the event instance is applied to the ontology in addition to the type of the task instance and the type of the data item instance.

3. The visualization system set forth in claim 2 wherein: the relationships include priority relationships between event types and task types; and the displayed information is further selected from the data item instance as determined by any priority relationship between the event type and the task type.

4. The visualization system set forth in claim 2 wherein: the event instances include event instances resulting from interaction of a user with the visualization system.

5. A visualization system for producing a visualization, information relating to a task being performed in the visualization system being displayed in the visualization in response to occurrence of an event in the visualization system, the displayed information having as its source a data item instance in an event instance representing the event and being selected from the data item instance as determined by a task instance representing the task and the visualization system having the improvement comprising: a set of ontology objects accessible to the visualization system, the set of ontology objects describing a plurality of types including types to which the data item instance and the task instance belong and relationships between types belonging to the plurality, the type of the task instance and the type of the data item instance being applied to the ontology to determine what information is to be selected from the data item instance.

* * * * *